US008425048B1

(12) United States Patent
Chamberlin et al.

(10) Patent No.: US 8,425,048 B1
(45) Date of Patent: Apr. 23, 2013

(54) PROJECTOR SYSTEMS WITH LIGHT BEAM ALIGNMENT

(71) Applicant: Intersil Americas Inc., Milpitas, CA (US)

(72) Inventors: Daryl Chamberlin, San Jose, CA (US); Dong Zheng, San Jose, CA (US)

(73) Assignee: Intersil Americas Inc., Milpitas, CA (US)

( * ) Notice: Subject to any disclaimer, the term of this patent is extended or adjusted under 35 U.S.C. 154(b) by 0 days.

(21) Appl. No.: 13/717,413

(22) Filed: Dec. 17, 2012

Related U.S. Application Data (62) Division of application No. 12/868,343, filed on Aug. 25, 2010, now Pat. No. 8,357, 889.

(60) Provisional application No. 61/296,987, filed on Jan. 21, 2010.

(51) Int. Cl.
*G03B 21/14* (2006.01)
*H04N 3/22* (2006.01)

(52) U.S. Cl.
USPC ............................................. 353/69; 348/745

(58) Field of Classification Search .............. 250/214 R, 250/208.2; 348/744, 745; 353/69, 85
See application file for complete search history.

(56) References Cited

U.S. PATENT DOCUMENTS

| | | | |
|---|---|---|---|
| 5,335,213 A | 8/1994 | Fukumoto et al. | |
| 5,406,067 A | 4/1995 | Keller | |
| 5,581,094 A | 12/1996 | Hara et al. | |
| 5,986,761 A * | 11/1999 | Crawforth et al. | ............ 356/600 |
| 6,054,703 A | 4/2000 | Liu | |
| 6,249,618 B1 | 6/2001 | Hou | |
| 6,266,010 B1 | 7/2001 | Ammar et al. | |
| 6,512,608 B2 | 1/2003 | Ohyama | |
| 6,759,641 B1 | 7/2004 | Loose | |
| 7,317,674 B2 | 1/2008 | Rees et al. | |
| 7,485,486 B2 | 2/2009 | Zheng et al. | |
| 7,635,836 B2 | 12/2009 | Zheng et al. | |
| 7,663,087 B2 | 2/2010 | Zheng et al. | |
| 8,357,889 B2 | 1/2013 | Chamberlin et al. | |
| 2004/0170093 A1 | 9/2004 | Kamiya | |
| 2004/0202072 A1 | 10/2004 | Rees et al. | |
| 2006/0164533 A1 | 7/2006 | Hsieh et al. | |

(Continued)

OTHER PUBLICATIONS

Restriction Requirement dated Aug. 15, 2012, U.S. Appl. No. 12/868,343, filed Aug. 25, 2010.

(Continued)

*Primary Examiner* — Thanh Luu
(74) *Attorney, Agent, or Firm* — Vierra Magen Marcus LLP (57) ABSTRACT

Embodiments of the present invention generally relate to circuits, systems and methods that can be used to detect light beam misalignment, so that compensation for such misalignment can be performed. In accordance with an embodiment, a circuit includes a photo-detector (PD) having a plurality of electrically isolated PD segments. Additionally, the circuit has circuitry, including switches, configured to control how currents indicative of light detected by the plurality of electrically isolated PD segments are arithmetically combined. When the switches are in a first configuration, a signal produced by the circuitry is indicative of vertical light beam alignment. When the switches are in a second configuration, the signal produced by the circuitry is indicative of horizontal light beam alignment. The signals indicative of vertical light beam alignment and horizontal light beam alignment can be used detect light beam misalignment, so that compensation for such misalignment can be performed.

18 Claims, 6 Drawing Sheets

U.S. PATENT DOCUMENTS

| | | |
|---|---|---|
| 2007/0072326 A1 | 3/2007 | Zheng et al. |
| 2007/0181688 A1 | 8/2007 | Li et al. |
| 2008/0197270 A1 | 8/2008 | Zheng et al. |
| 2008/0205820 A1 | 8/2008 | Zheng et al. |
| 2009/0046269 A1 | 2/2009 | Essling |
| 2009/0128717 A1* | 5/2009 | Nagashima et al. .......... 348/756 |

OTHER PUBLICATIONS

Response to Restriction Requirement dated Aug. 15, 2012, U.S. Appl. No. 12/868,343, filed Aug. 25, 2010.

Non-final Office Action dated Sep. 4, 2012, U.S. Appl. No. 12/866,343, filed Aug. 25, 2010.

Response to Office Action dated Sep. 17, 2012, U.S. Appl. No. 12/868,343, filed Aug. 25, 2010.

Final Office Action dated Sep. 27, 2012, U.S. Appl. No. 12/868,343, filed Aug. 25, 2010.

Response to Office Action dated Oct. 12, 2012, U.S. Appl. No. 12/868,343, filed Aug. 25, 2010.

Notice of Allowance dated Oct. 18, 2012, U.S. Appl. No. 12/868,343, filed Aug. 25, 2010.

* cited by examiner

PROJECTOR SYSTEMS WITH LIGHT BEAM ALIGNMENT

CLAIM OF PRIORITY

This application is a Divisional Application of U.S. patent application Ser. No. 12/868,343, filed Aug. 25, 2010, which claims priority under 35 U.S.C. 119(e) to U.S. Provisional Patent Application No. 61/296,987, filed Jan. 21, 2010, both of which are incorporated herein by reference.

BACKGROUND

Figure 1:
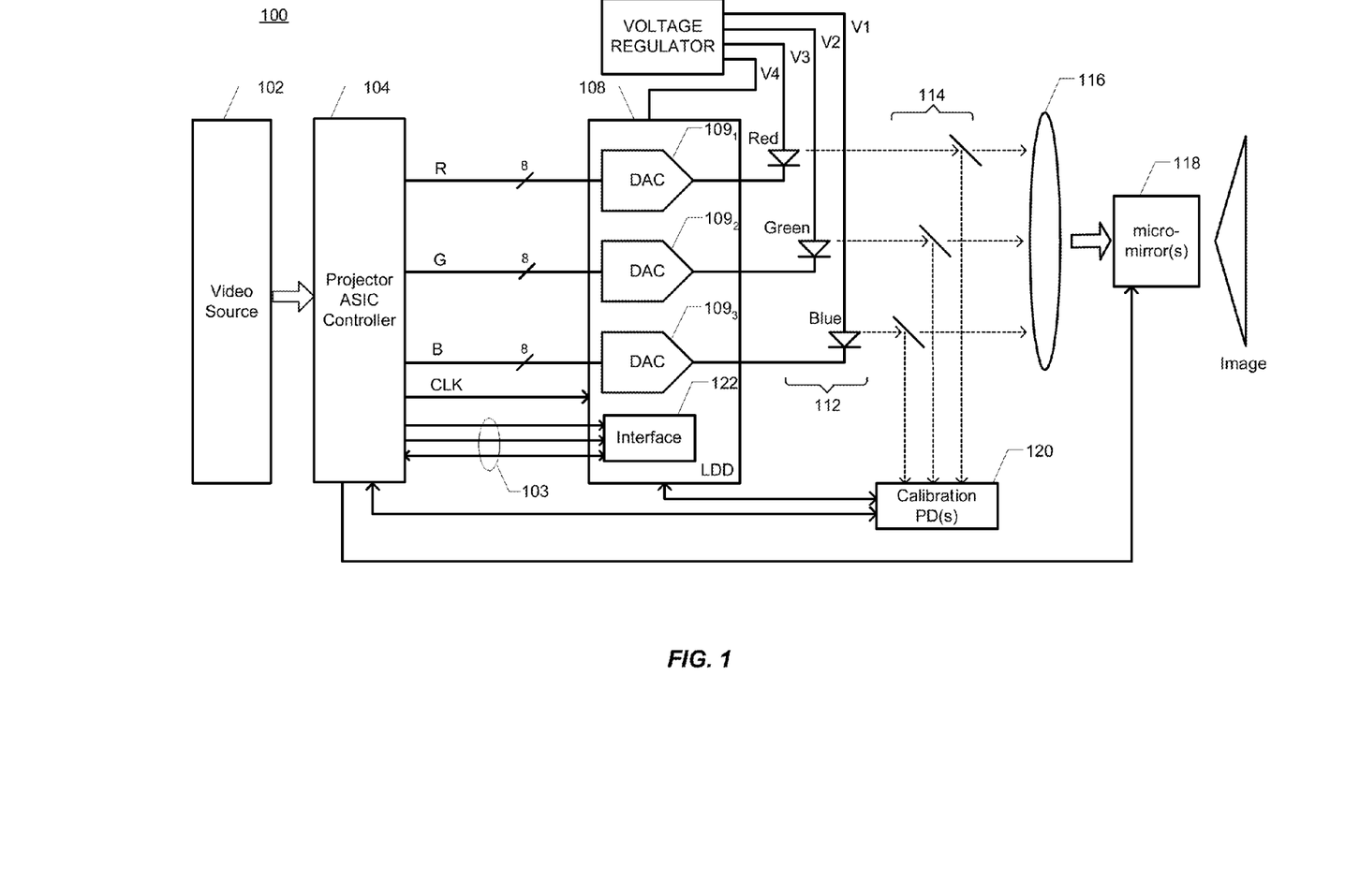
FIG. 1 illustrates an exemplary miniature projector display device, sometimes referred to as a picoprojector.

FIG. 1 illustrates an exemplary miniature projector display device 100, sometimes referred to as a picoprojector. The miniature projector device 100 can be integrated with or attached to a portable device, such as, but not limited to, a mobile phone, a smart phone, a portable computer (e.g., a laptop or netbook), a personal data assistant (PDA), or a portable media player (e.g., DVD player). The miniature projector device 100 can alternatively be integrated with or attached to a non-portable device, such as a desktop computer or a media player (e.g., a DVD player), but not limited thereto. The miniature projector device 100 can alternatively be a stand alone device.

Referring to FIG. 1, the projector display device 100 is shown as including a video source 102, a controller 104 (e.g., an application specific integrated circuit and/or a micro-controller), a laser diode driver (LDD) 108 and a voltage regulator 110. Depending on the type of video source, a video analog-font-end (AFE) can be included between the video source and controller, and the video AFE may include, e.g., one or more analog-to-digital converters (ADCs). For example, if the input is a Video Graphics Array (VGA) input, then a video AFE may be included. However, a video AFE may not be needed where the video source is a digital video source.

The controller 104 can perform scaling and/or pre-distortion of video signals before such signals are provided to the LDD 108. The voltage regulator 110 (e.g., a quad-output adjustable DC-DC buck-boost regulator) can convert a voltage provided by a voltage source (e.g., a battery or AC supply) into the various voltage levels (e.g., four voltage levels V1, V2, V3 and V4) for powering the various components of the projector display device 100.

The LDD 108 is shown as including three digital-to-analog converts DACs $109_1$, $109_2$ and $109_3$ (which can be collectively referred to as DACs 109). The LDD is also shown as including a serial interface 122 which may receive, via a serial bus 103, a serial enable (SEN) signal and a serial clock signal (SClk) from a serial interface of the controller 104. Additionally, a bi-directional serial data input/output (SDIO) line of the serial bus 103 allows the controller 104 to write data to and read data from registers within the LDD 108. Alternative serial buses and interfaces can be used, such as, but not limited to, an Inter-Integrated Circuit (I2C) or an Serial Peripheral Interface (SPI) bus and interface. The LDD 108 also includes registers, and the like, which are not shown.

The DACs 109 of the LDD 108 drive laser diodes 112, which can include, e.g., a red, a green and a blue laser diode, but are not limited thereto. Where the LDD 108 is used to drive a red (R), a green (G) and a blue (B) laser diode, the LDD can be referred to as a RGB triple laser diode driver.

The light produced by the laser diodes 112 can be provided to beam splitters 114, which can direct a small percentage of the light toward one or more calibration photo-detectors (PDs) 120, and direct the remainder of the light toward projector optics 116, which include lenses, mirrors, reflection plates and/or the like. The light output by the optics 116 can be provided to one or more micro mirror(s) 118. The mirror(s) 118 can be controlled by the controller 104, or another portion of the system, to raster-scan reflected light onto a surface, e.g., a screen, a wall, the back of a chair, etc. Because of the scanning of laser beams performed using the mirror(s) 118, the projector 100 can be referred to as a laser based scanning projector 100. In one configuration, a single mirror 118 that can be controlled in both the X and Y directions is used for scanning of the laser beams. In another configuration, a first mirror 118 is used for controlling horizontal scanning (i.e., scanning in the X direction), and a second mirror 118 is used for controlling vertical scanning (i.e., scanning in the Y direction). These are just two exemplary configurations, which are not meant to be limiting. It is also possible that more than two mirrors 118 be used.

Figure 2A:
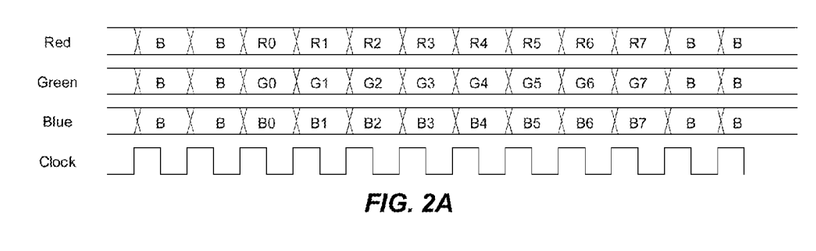
FIG. 2A illustrates an exemplary timing diagram for a laser based scanning projector, wherein at each clock cycle, red, green and blue lasers diodes output a pixel intensity at a location set by the linear speed of the scanning mirror(s) and a clock time base.

In a laser based scanning projector, at each clock cycle, the R, G, and B lasers diodes output a pixel intensity at a location set by the linear speed of the scanning mirror(s) 118 and a clock time base, as can be appreciated from the exemplary timing diagram of FIG. 2A. In the exemplary timing diagram of FIG. 2A, there are only 8 pixels per horizontal line, and there is no output during each blanking period (B). However, it is noted that there are typically many more pixels per line in a normal display. At each clock cycle, each color data pixel intensity can be either controlled using a pulse width modulation (PWM) scheme, where the R, G and B lasers diodes are turned on for different durations, or by amplitude modulation (AM), where the R, G and B laser diodes may all be driven at the same time but with different current levels.

Figure 2B:
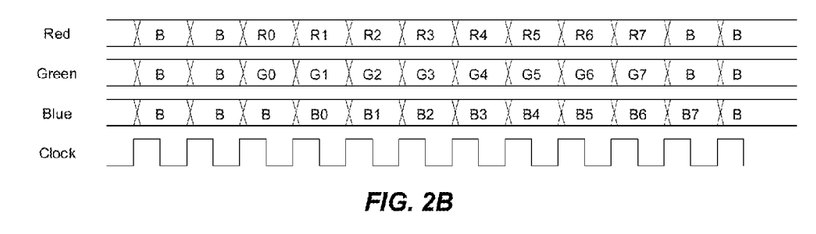
FIG. 2B is an exemplary timing diagram that is used to show a shift in laser beam pointing direction, which causes misalignment among pixel colors.

Over time, a laser beam pointing direction might shift for various reasons, which causes misalignment among pixel colors. This is illustrated in timing diagram of FIG. 2B, which represents the observed timing relative to the image being displayed (as opposed to the timing of the data being sent from the controller 104 to the LDD 108). FIG. 2B attempts to illustrate that the blue laser shifts to the right hand side (RHS) by one pixel (or close to one pixel), resulting in a color offset in the displayed image, which is undesirable.

The laser beams produced by the R, G and B laser diodes can be or become misaligned for various reasons. For example, there will be some inherent misalignment that results from imperfect mechanical manufacturing of a projector system. Further, misalignment can occur due to mechanical modifications that occur to a projector system, e.g., if the projector system is dropped. Additionally, misalignment can also result from the thermal changes to the laser diodes, as well as aging of the laser diodes.

SUMMARY

Embodiments of the present invention generally relate to circuits, systems and methods that can be used to detect light beam misalignment, so that compensation for such misalignment can be performed. Such light beams are produced by light emitting elements, such as, but not limited to, laser diodes or light emitting diodes (LEDs). Where the light beams are produced by laser diodes, the light beams can be referred to as laser beams.

In accordance with an embodiment, an opto-electronics circuit includes a plurality of electrically isolated PD segments. Additionally, the opto-electronics circuit has circuitry, including switches, configured to control how currents indicative of light detected by the plurality of electrically isolated PD segments are arithmetically combined. When the switches are in a first configuration, a signal produced by the opto-electronics circuit is indicative of vertical light beam alignment. When the switches are in a second configuration, a signal produced by the opto-electronics circuit is indicative of horizontal light beam alignment. When the switches are in a third configuration, a signal produced by the opto-electronics circuit is indicative of light beam power. The circuitry, configured to control how the currents are arithmetically combined, can also include trans-impedance amplifiers (TIAs) and summing circuitry. In a specific embodiment, only two TIAs are required, reducing the power and complexity of the opto-electronics circuit.

In accordance with an embodiment, the plurality of electrically isolated PD segments includes four electrically isolated PD segments. Each of the four electrically isolated PD segments produces a corresponding current indicative an amount of light detected by the PD segment.

In accordance with an embodiment, the equation Y_Offset=(A+B)−(C+D) is used to produce the signal indicative of vertical light beam alignment, where A is indicative of the current produced by a first one of the four electrically isolated PD segments, B is indicative of the current produced by a second one of the four electrically isolated PD segments, C is indicative of the current produced by a third one of the four electrically isolated PD segments, and D is indicative of the current produced by a fourth one of the four electrically isolated PD segments. In accordance with an embodiment, the equation X_Offset=(A+C)−(B+D) is used to produce the signal indicative of horizontal light beam alignment. Additionally, the equation Power=A+B+C+D can be used to determine a measure of power of a light beam, which can be used, e.g., for automatic power control (APC) and/or color calibration.

In dependence on the signals indicative of vertical light beam alignment and the signals indicative of horizontal light beam alignment, a controller can detect when one of the light beams produced by the light emitting elements is misaligned relative to the other light beams produced by the other light emitting elements. Additionally, the controller can compensate for the detected misalignment by controlling timing of color data that is used to produced the signals that drive the light emitting elements. In dependence on the signals indicative of light beam power, the controller can detect when an output power of one or more light beams produced by one or more of the light emitting elements changes. Additionally, the controller can compensate for the detected change in output power by changing an amplitude and/or pulse width of one or more signals that drive the light emitting elements.

Embodiments of the present invention are also directed to projector systems that include the opto-electronics circuit described above. Such a projector system can also include, e.g., a first laser diode that emits light of a first color, a second laser diode that emits light of a second color, and a third laser diode that emits light of a third color. Additionally, the projector system can also included a controller, a laser diode driver (LDD), and one or more micro-mirror(s). The controller can be configured to output first, second and third pixel data in dependence on a video signal received from a video source. The LDD can be configured to drive the first, second and third laser diodes in dependence on the first, second and third pixel data received from the controller. The one or more micro-mirror(s) can be controlled by the controller and can be configured to project an image in dependence on laser beams produced by the first, second and third laser diodes. Additionally, the controller can be configured to detect vertical and/or horizontal laser beam misalignment(s) in dependence on signals produced by the opto-electronics circuit, as well as to compensate for detected vertical and/or horizontal laser beam misalignment(s) so that laser beam misalignment(s) do not adversely affect the image projected by the one or more micro-mirror(s).

This summary is not intended to summarize all of the embodiments of the present invention. Further and alternative embodiments, and the features, aspects, and advantages of the embodiments of invention will become more apparent from the detailed description set forth below, the drawings and the claims.

DETAILED DESCRIPTION

Various reason for laser beam (and more generally, light beam) misalignment were described above. Embodiments of the present invention described herein can be used to detect and compensate for all of the above causes for misalignment.

An exemplary laser beam misalignment was described above with reference to the timing diagram of FIG. 2B, which represents the observed timing relative to the image being displayed (as opposed to the timing of the data being sent from the controller 104 to the LDD 108). More specifically, FIG. 2B attempts to illustrate that the blue laser shifted to the right hand side (RHS) by one pixel (or close to one pixel), resulting in a color offset in the displayed image. This can also be appreciated from FIG. 2C, which shows exemplary signals indicative of the horizontal laser beam alignment for each of the red, green and blue laser diodes, e.g., using the equation X_Offset=(A+C)−(B+D), which equation, and other equations, are explained in more detail below.

Figure 3:
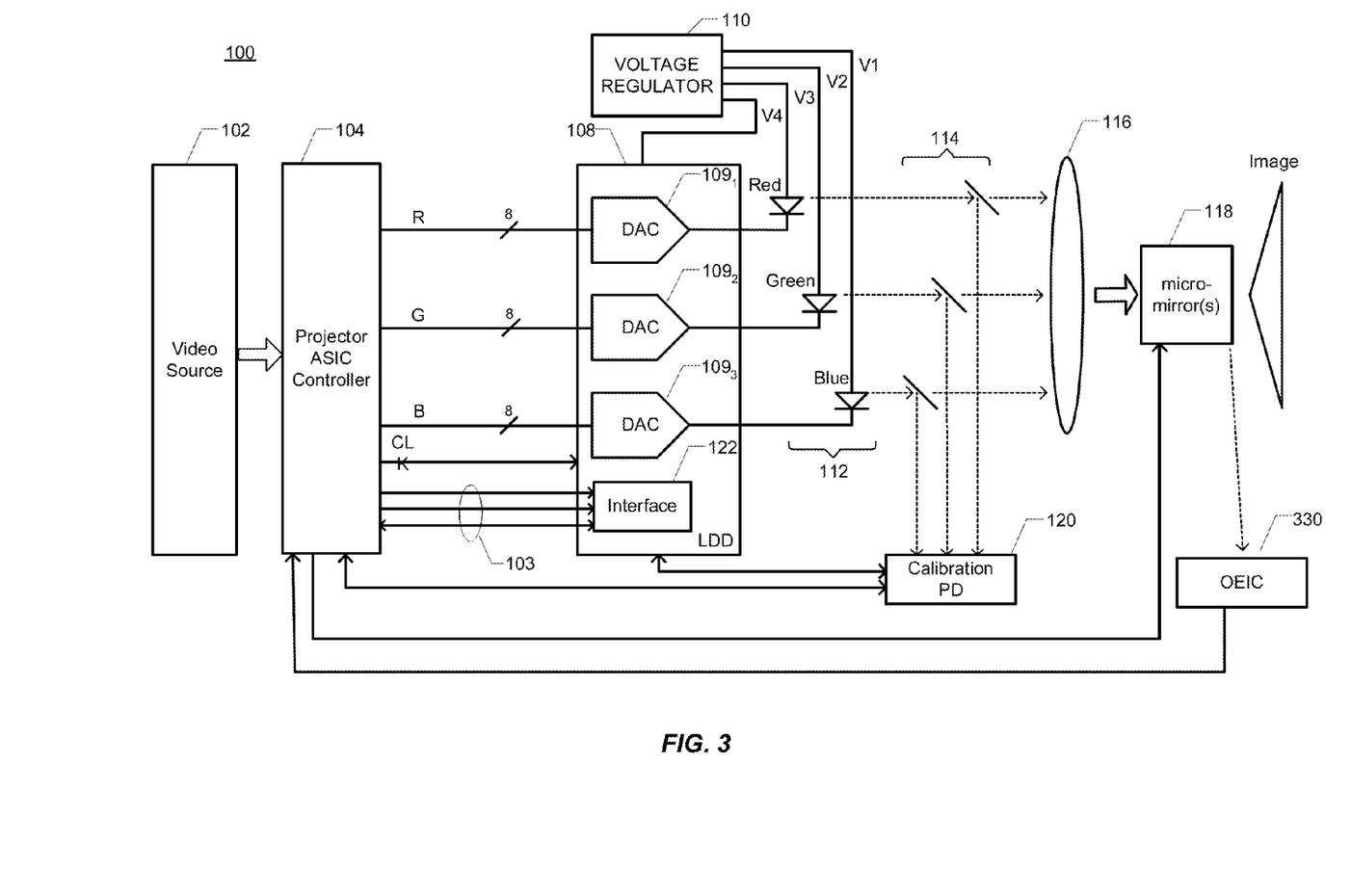
FIG. 3 illustrates an opto-electronics integrated circuit (OEIC), according to an embodiment of the present invention, which is used to monitor alignment of the red, green and blue laser beams, which enables laser beam re-alignment to be performed when necessary.
Figure 4A:
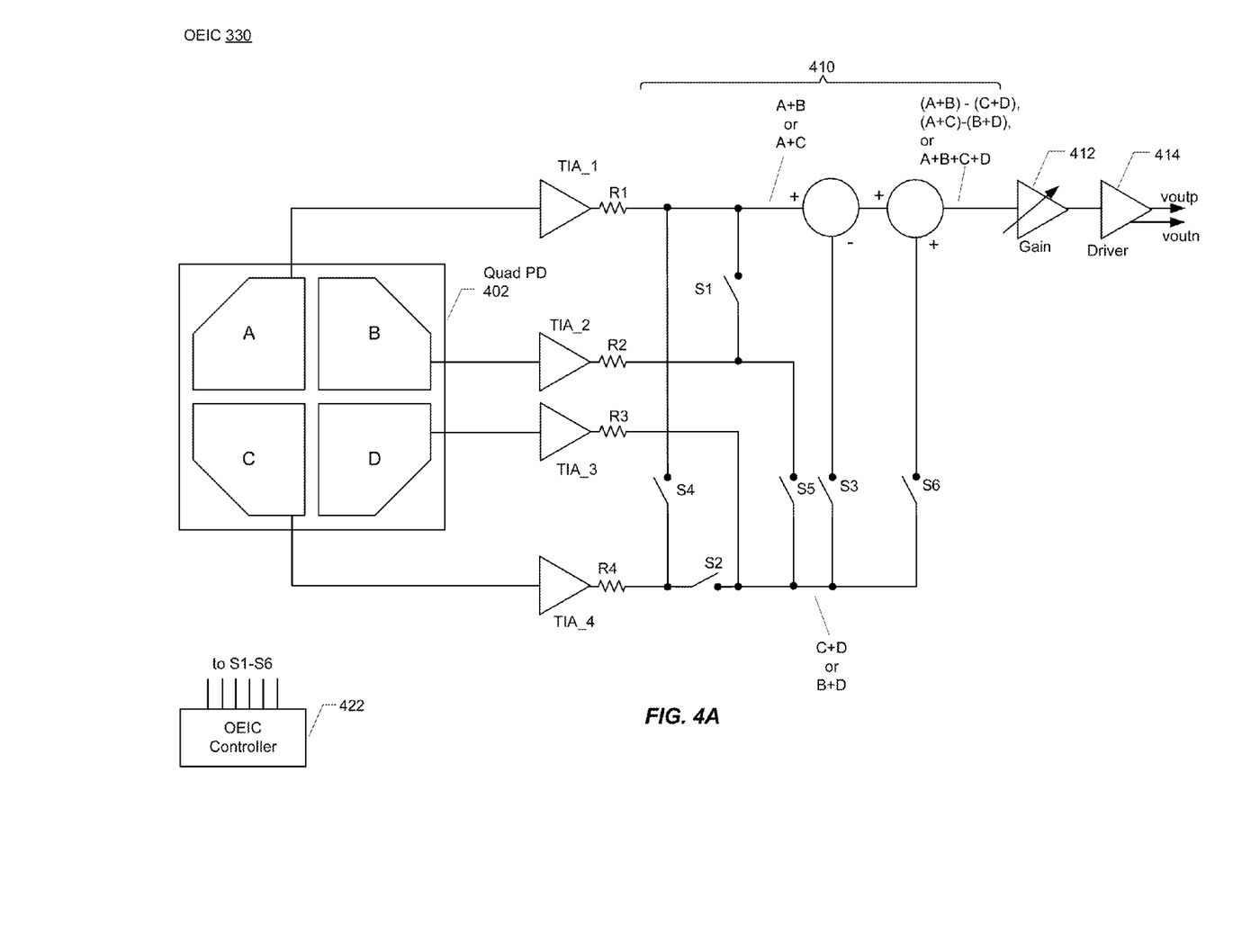
FIG. 4A illustrates details of the OEIC introduced in FIG. 3, according to an embodiment of the present invention, wherein the OEIC includes a photodetector (PD) having four electrically isolated PD segments and four transimpedance amplifiers (TIAs).

Referring to FIG. 3, in accordance with an embodiment of the present invention, an opto-electronics integrated circuit (OEIC) 330 is used to monitor alignment of the red, green and blue laser beams, which enables laser beam re-alignment to be performed when necessary (such laser beam re-alignment can also be referred to as compensation for laser beam misalignment). Referring to FIG. 4A, in accordance with a specific embodiment, the OEIC 330 includes a photodetector (PD) 402 that includes four electrically isolated PD segments (referred to and shown as segments A, B, C and D). Still referring to FIG. 4A, the four PD segments are arranged in two rows and two columns, such that the PD segments are generally arranged in a checkerboard manner. Due to its four segments, the PD 402 can be referred to herein as a quad PD 402. The quad PD 402 can be positioned relative to the mirror(s) 118 (e.g., at the end of a scan line), and/or addition optics and/or beam splitters can be used so that laser beams are incident on the quad PD when alignment (and/or automatic power control) is being performed, which is discussed in more detail below. Regardless of where the quad PD 402 (and more generally, the OEIC 330) is located, it should not adversely affect the image being projected.

In accordance with an embodiment, the size of each segment of the quad PD 402 is slightly larger than the size of the laser beam that is being aligned using the quad PD 402. For example, each of the four segments of the quad PD can be approximately 350×350 micrometers ($\mu$m), and the diameter of the laser beam can be approximately 300 $\mu$m. The gap between the adjacent PD segments can be, e.g., 10 $\mu$m. Exemplary shapes of each PD segment are shown in FIG. 4A, but alternative shapes are possible and within the scope of the present invention. For example, each segment can be shaped like a square, a rectangle, or a quarter of a circle, but is not limited thereto.

By placing the quad PD 402 at an appropriate location relative to the laser beams being scanned (e.g., such that the quad PD 402 detects beams projected near a center of the projector output), currents generated by the four PD segments (which can be referred to as currents A, B, C and D) can be combined in various manners to monitor the vertical and horizontal alignment of the R, G and B laser beams generated by the laser diodes 112. Such currents can also be used to monitor the power of each of the R, G and B laser beams, and thus, the quad PD 402 can also be used for automatic power control (APC). APC can be used to control the intensity output of the laser diodes to compensate for changes in characteristics of the laser diodes, e.g., due to environmental (e.g., thermal) variations and/or aging of the laser diodes 112.

Referring to FIG. 4A, in accordance with an embodiment, to determine a vertical offset of a laser beam (also referred to as the Y_Offset), the following equation can be used:

$$Y\_Offset=(A+B)-(C+D) \qquad \{\text{Equation 1}\}.$$

Still referring to FIG. 4A, in accordance with an embodiment, to determine a horizontal offset of a laser beam (also referred to as the X_Offset), the following equation can be used:

$$X\_Offset=(A+C)-(B+D) \qquad \{\text{Equation 2}\}.$$

Additionally, in accordance with an embodiment, to determine the power of a laser beam for use with automatic power control (APC) and color calibration, the following equation can be used:

$$Power=A+B+C+D \qquad \{\text{Equation 3}\}.$$

Such power measurements can be used to ensure that the power of the laser beams produced by each of the laser diodes (or more generally, the power of the light beams produced by each of the light emitting elements) can be consistently maintained at desired levels. This enables there to always be a known ratio between the red, blue and green color intensities, to provide for proper color calibration (the color calibration can include white balancing and gamma correction, but is not limited thereto). Additionally, this enables the power of each of the light beams to remain the same over time to provide for consistent operation as output power of a light emitting element changes due to changes in temperature and/or degrades over time due to long term drift (e.g., due to aging).

In these equations: A is a current indicative of the intensity of the light detected by PD segment A; B is a current indicative of the intensity of the light detected by PD segment B; C is a current indicative of the intensity of the light detected by PD segment C; and D is a current indicative of the intensity of the light detected by PD segment D. Such currents may be amplified prior to or after being combined, but their intensities relative to one another should remain the same.

Each of the four electrically isolated PD segments produces a corresponding current indicative an amount of light detected by the PD segment. In FIG. 4A the current produced by each PD segment is provided to a corresponding transimpedance amplifier (TIA), which provides amplification and coverts the current produced by each PD section to a corresponding voltage. At the output of each TIA is a resistor (R) which converts the voltage at the output of the TIA back to a current. More specifically, TIA_1 converts the current produced by PD segment A to a voltage, and resistor R1 converts the voltage at the output of TIA_1 back to a current; TIA_2 converts the current produced by PD segment B to a voltage, and resistor R2 converts the voltage at the output of TIA_2 back to a current; TIA_3 converts the current produced by PD segment D to a voltage, and resistor R3 converts the voltage at the output of TIA_3 back to a current; and TIA_4 converts the current produced by PD segment C to a voltage, and resistor R4 converts the voltage at the output of TIA_4 back to a current.

The OEIC 330 also includes current a summing stage 410 (e.g., implemented using current mirrors and summing nodes), a gain stage 412 (which can be adjustable) and an output driver 414. The summing stage 410 (also referred to as summing circuitry) can perform subtraction, depending on how it is implemented, as can be appreciated from FIG. 4A (and FIG. 4B discussed below). The gain stage 412 can increase the amplitude of the current resulting from the summing stage 410 before the current is provided to the output driver 414. The voltage output (vout) of the output driver 414, which can be single ended or differential, can be provided to the controller 104 (see FIG. 3). The switches S1 through S6 can be controlled by an OEIC controller 422 so that the output of the OEIC is selectively a voltage indicative of: (A+B)−(C+D); (A+C)−(B+D); or A+B+C+D. For example, assuming a "0" is used to represent an open switch, and a "1" is used to represent a closed switch, then the following functions can be implemented by the OEIC controller 422:

to achieve (A+B)−(C+D): S1=1, S2=1, S3=1, S4=0, S5=0, S6=0;

to achieve (A+C)−(B+D): S1=0, S2=0, S3=1, S4=1, S5=1, S6=0; and to achieve (A+B+C+D): S1=1, S2=1, S3=0, S4=0, S5=0, S6=1.

The voltage signal(s) output by the output driver 414 can be provided directly back to the controller 104 (in FIG. 3), or first converted from analog to digital by an analog-to-digital converter (ADC). Such an ADC can be part of the OEIC 330, or external the OEIC 330. The OEIC controller 422 can be, e.g., an application specific integrated circuit, a micro-controller, a decoder or a state machine, but is not limited thereto.

Figure 4B:
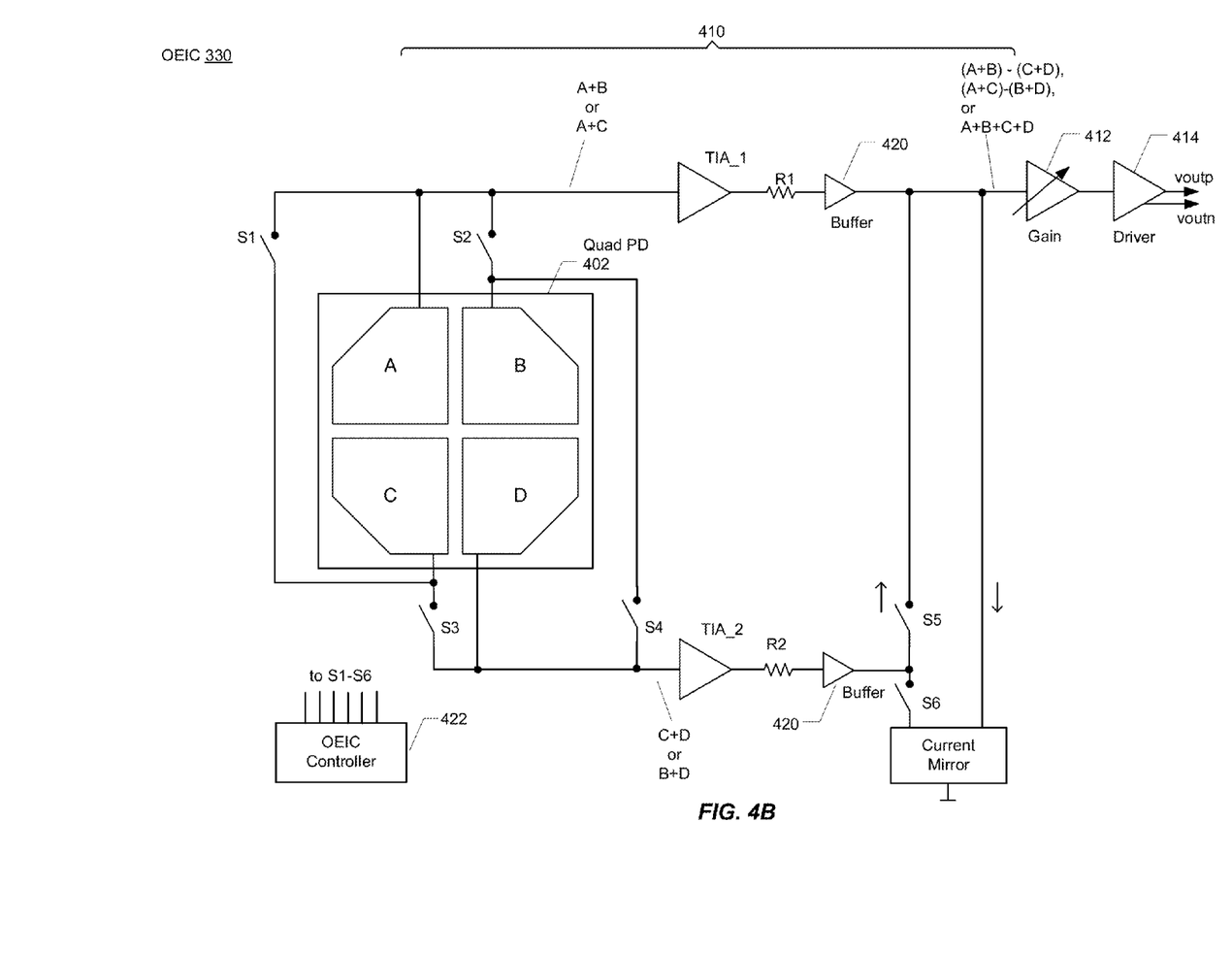
FIG. 4B shows an alternative embodiment of the OEIC, that reduces power and complexity by using only 2 TIAs.

FIG. 4B shows an alternative embodiment that reduces power and complexity of the OEIC by using only 2 TIAs (instead of 4). In a similar manner as in FIG. 4A, the switches S1 through S6 are controlled by the OEIC controller 422 so that the output of the OEIC is selectively a voltage indicative of: (A+B)−(C+D); (A+C)−(B+D); or A+B+C+D. Again, assuming a "0" is used to represent an open switch, and a "1" is used to represent a closed switch, then the following functions can be implemented by the OEIC controller 422:

to achieve (A+B)−(C+D): S1=0, S2=1, S3=1, S4=0, S5=0, S6=1;

to achieve (A+C)−(B+D): S1=1, S2=0, S3=0, S4=1, S5=0, S6=1; and to achieve (A+B+C+D): S1=0, S2=1, S3=1, S4=0, S5=1, S6=0.

FIG. 4B also shows that buffers 420 can be used to isolate that TIAs from portion(s) of the current summing stage 410 (e.g., implemented using a current mirror). In an embodiment, the controller 104 (in FIG. 3) can perform the functions of the OEIC controller 422, eliminating the need for the separate OEIC controller 422. In other embodiments, the controller 104 (in FIG. 3) communicates with the OEIC controller 422.

Figure 2C:
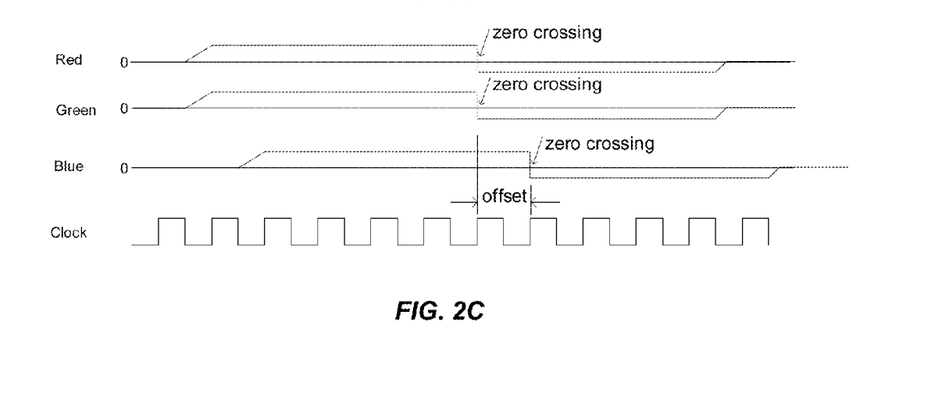
FIG. 2C illustrates exemplary signals indicative of the horizontal laser beam alignment produced in accordance with an embodiment of the present invention.

When performing laser beam alignment, both vertical alignment and horizontal alignment can be performed. For horizontal alignment, Equation 1 (i.e., Y_Offset=(A+B)−(C+D)) can be used. For vertical alignment, Equation 2 (i.e., X_Offset=(A+C)−(B+D)) can be used. In accordance with an embodiment, the laser beam alignment can be performed during initialization of the projector system, e.g., each time the projector system is turned from off to on, or more frequently if desired. For vertical alignment each laser beam is scanned vertically using the mirror(s) 118 (while the other laser beams are turned off) so that the beam vertically crosses the center of the quad PD 402. For horizontal alignment each laser beam is scanned horizontally using the mirror(s) 118 (while the other laser beams are turned off) so that the beam horizontally crosses the center of the quad PD 402. The controller 104 records the location and/or timing data indicative of when the laser beam crosses the center of the quad PD 402, which is when there is a zero crossing resulting from the equation (A+B)−(C+D) for vertical alignment, and when there is a zero crossing resulting from the equation (A+C)−(B+D) for horizontal alignment. Based on the signals received from the OEIC 330, the controller 104 can recognize when a laser beam is misaligned relative to the other laser beams, and the controller 104 can control when it outputs specific color pixel data signals to compensate for the laser misalignment. For example, referring to the exemplary signals in FIG. 2C, illustrative of (A+C)−(B+D), the controller 104 can recognize that the blue laser beam is horizontally misaligned relative to the red and green laser beams, and the controller 104 can output blue signal one horizontal scan clock cycle earlier, to compensate for the blue laser beam horizontal misalignment. Vertical misalignment can be compensated for in a similar manner. For example, if the controller 104 recognizes that the blue laser beam is vertically misaligned relative to the red and green laser beam, the controller 104 can output the blue signal one vertical scan clock cycle early or late.

Embodiments of the present invention can be used to detect laser beam misalignment (and compensate for such) as often as desired. For example, a system can be designed such that laser beam misalignment is only checked for relatively infrequently, e.g., upon power up of a projector system, as mentioned above. For another example, a system can be designed such that laser beam misalignment is checked for more frequently, e.g., once per scan line, once per frame, or once per period of time (e.g., once every 5 minutes), but is not limited thereto.

As mentioned above, Equation 3 (i.e., A+B+C+D) can be used for automatic power control (APC), to calibrate for changes in efficiency of laser diodes due to changing in temperature, aging, etc. Such use of the OEIC 330 in this manner can negate the need for the separate calibration PD 120 shown in FIG. 3.

While the laser diodes described herein were described as being red, green and blue in color, it is within the scope of the present invention that the laser diodes emit light of colors other than red, green and blue, such as, but not limited to, cyan, magenta and yellow. It is also within the scope of the present invention that more three colors are produced per pixel by the laser diodes, e.g., red, green, blue and yellow (e.g., if four laser diodes are used, the LDD 108 could include four DACs).

While the OEIC 330 and its quad PD 402 were described as being used to detect and compensate for laser beam misalignment, the OEIC 330 and its quad PD 402 can alternatively be used to detect and compensate for misalignment of light beams produced by other types of light emitting element, including, but not limited to, light emitting diodes (LEDs). As the term light beam is used herein, it can be a beam produced by a laser diode (i.e., a laser beam), a beam produced by an LED, or a beam produced by some other light emitting element.

In the above discussion of FIGS. 4A and 4B, it was noted that the size of each PD segment of the quad PD 402 should be slightly larger than the size of the laser beam that is being aligned using the quad PD 402. LEDs produce light beams that are less focused, and thus, larger than light beams produced by laser diodes. Accordingly, where the quad PD 402 is to be used with LEDs (or other light emitting elements), the PD segments should be sized accordingly. For example, each PD segment size would likely need to be increased if LEDs were used instead of laser diodes.

Figure 5:
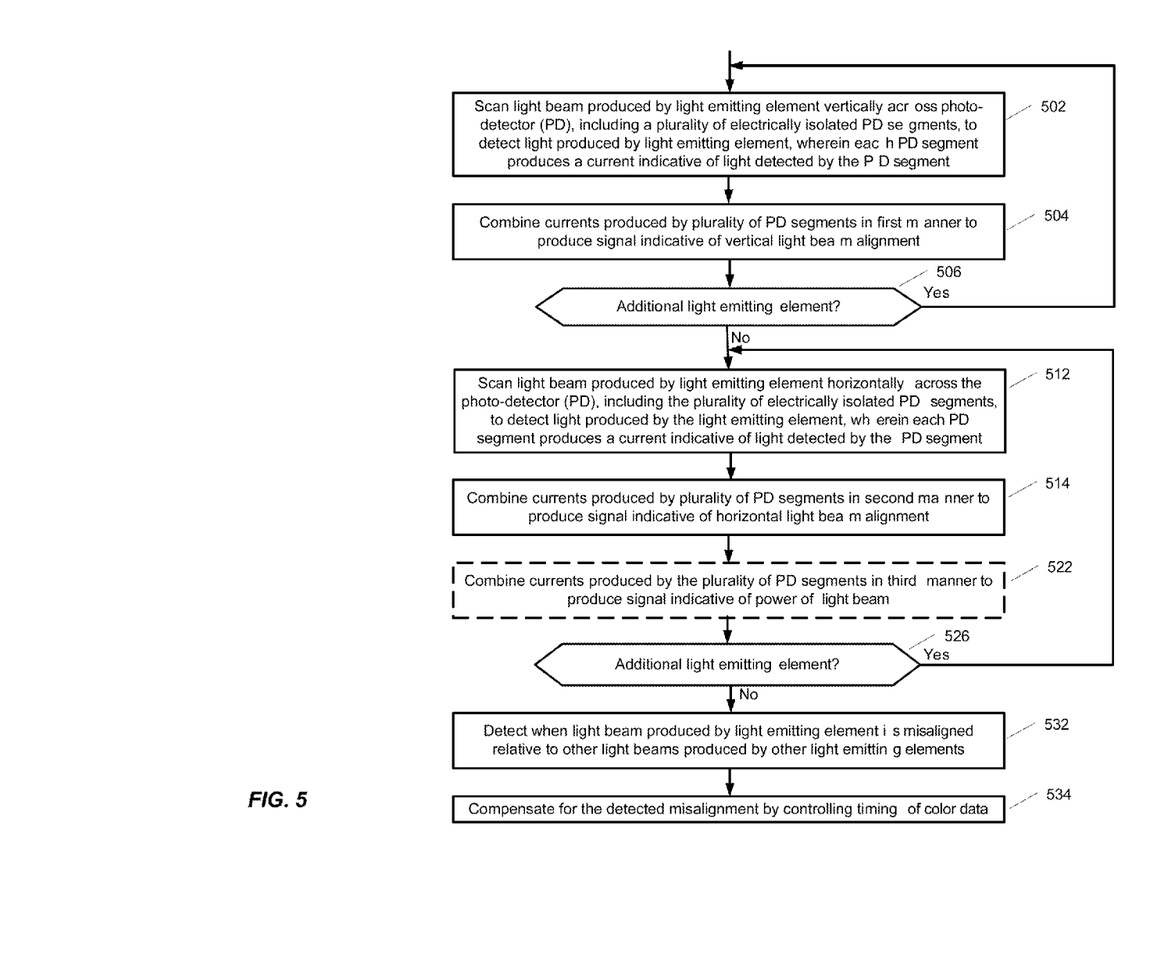
FIG. 5 is a high level flow diagram that is used to summarize methods in accordance with embodiments of the present invention.

FIG. 5 will now be used to summarize methods in accordance with embodiments of the present invention. Such methods are for use with light emitting elements, such as, but not limited to laser diodes or LEDs, each of which produces a light beam when driven.

As indicated at step 502, a light beam produced by one of a plurality of light emitting elements is scanned vertically across a photo-detector (PD), including a plurality of electrically isolated PD segments, wherein each PD segment is used to detect light produced by the light emitting element, and wherein each PD segment produces a current indicative of light detected by the PD segment. The quad PD 402, shown in FIGS. 4A and 4B, is an example of the PD that can be used to perform step 502.

As indicated at step 504, the currents produced by the plurality of PD segments are combined in a first manner, e.g., using Equation 1, to produce a signal indicative of vertical light beam alignment.

As indicated by step 506, steps 502 and 504 are repeated for each of a plurality of light beams, to thereby produce the signal indicative of vertical light beam alignment for each of the light emitting elements (e.g., each of a red, green and blue laser diode).

Referring now to step 512, a light beam produced by one of the plurality of light emitting elements is scanned horizontally across the same photo-detector (PD) including the plurality of electrically isolated PD segments, wherein each PD segment is used to detect light produced by the light emitting element, and wherein each PD segment produces a current indicative of light detected by the PD segment. As indicated at step 514, the currents produced by the plurality of PD segments are combined in a second manner, e.g., using Equation 2, to produce a signal indicative of horizontal light beam alignment. FIG. 2C illustrates examples of signals indicative of horizontal light beam alignment for each of a red, green and blue laser diode.

At step 522 the currents are optionally combined in a third manner, e.g., using Equation 3, to produce a signal indicative of power of the light beam produced by the light emitting element.

As indicated by step 526, steps 512 and 514 (and optionally 522) are repeated for each of the plurality of light beams, to thereby produce the signal indicative of horizontal light beam alignment for each of the light emitting elements (e.g., each of a red, green and blue laser diode), and optionally to also produce the signal indicative of power for each of the light emitting elements. As described above, the power measurements can be used for APC and/or color calibration, but is not limited thereto.

At step 532, vertical light beam misalignment and/or horizontal light beam misalignment can be detected, if such misalignment exists. More specifically, the signals indicative of vertical light beam alignment can be used to detect vertical light beam misalignment, and the signals indicative of horizontal light beam alignment can be used to detect horizontal light beam misalignment (e.g., as described above with reference to FIG. 2C).

At step 534, if vertical light beam misalignment and/or horizontal light beam misalignment is detected, compensation for such misalignment is performed by controlling the timing of color data. An example of this was described above.

The various steps of FIG. 5 can be performed in a different order than shown, while still being within the scope of the present invention. For example, the light beam produced by one of the light emitting elements can be scanned both vertically and horizontally, to thereby produce both the signal indicative of vertical light beam alignment and the signal indicative of horizontal light beam alignment, before doing the same for the other light emitting elements. It is also possible that optional step 522 be performed between steps 502 and 504, between steps 504 and 506, or between steps 512 and 514. Further, horizontal light beam alignment may be determined prior to vertical light beam alignment (e.g., steps 512 and 514 can be performed prior to steps 502 and 504). These are just a few examples of how the order of the steps can be changed. One of ordinary skill in the art reading this description would realize that other variations are possible and within the scope of the present invention. An additional step can include detecting, in dependence on the signals indicative of light beam power produced at step 522, when an output power of one or more light beams produced by one or more of the light emitting elements changes. Further, the detected change in output power can be compensated for by changing an amplitude and/or pulse width of one or more signals that drive the light emitting elements.

The foregoing description is of the preferred embodiments of the present invention. These embodiments have been provided for the purposes of illustration and description, but are not intended to be exhaustive or to limit the invention to the precise forms disclosed. Many modifications and variations will be apparent to a practitioner skilled in the art.

Embodiments were chosen and described in order to best describe the principles of the invention and its practical application, thereby enabling others skilled in the art to understand the invention. Slight modifications and variations are believed to be within the spirit and scope of the present invention. It is intended that the scope of the invention be defined by the following claims and their equivalents.

What is claimed is:

1. A projector system, comprising:
   a first light emitting element that emits light of a first color;
   a second light emitting element that emits light of a second color;
   a third light emitting element that emits light of a third color;
   a controller configured to produce first, second and third pixel data in dependence on a video signal received from a video source;
   a driver configured to drive the first, second and third light emitting elements in dependence on the first, second and third pixel data produced by the controller;
   one or more micro-mirror(s) that project an image in dependence on light beams produced in dependence on the light of the first, second and third colors emitted by the first, second and third light emitting elements; and
   an opto-electronics circuit including
      a plurality of electrically isolated photodetector (PD) segments; and
      circuitry configured to control how currents indicative of light detected by the plurality of electrically isolated PD segments are arithmetically combined;
   wherein the controller is also configured to
      detect vertical and/or horizontal light beam misalignment(s) in dependence on signals produced by the opto-electronics circuit, and
      compensate for detected vertical and/or horizontal light beam misalignment(s);
   wherein each of the plurality of electrically isolated PD segments produces a corresponding current indicative an amount of light detected by the PD segment;
   wherein the circuitry, configured to control how currents indicative of light detected by the plurality of electrically isolated PD segments are arithmetically combined, comprises switches, trans-impedance amplifiers (TIAs), and summing circuitry;
   wherein when the switches are in a first configuration, a signal produced by the opto-electronics circuit is used by the controller to detect vertical light beam misalignment; and
   wherein when the switches are in a second configuration, a signal produced by the opto-electronics circuit is used by the controller to detect horizontal light beam misalignment.

2. The projector system of claim 1, wherein when the switches are in a third configuration, a signal produced by the opto-electronics circuit is used by the controller to perform at least one of automatic power control (APC) or color calibration.

3. The projector system of claim 2, wherein the controller is configured to compensate for a detected change in output power by changing an amplitude and/or pulse width of one or more drive signals produced by the driver to drive the light emitting elements.

4. The projector system of claim 1, wherein:
   the first color is red;
   the second color is green;
   the third color is blue;
   the first pixel data is red pixel data;
   the second pixel data is green pixel data; and
   the third pixel data is blue pixel data.

5. The projector system of claim 4, wherein the controller is configured to compensate for detected vertical and/or horizontal light beam misalignment(s) by adjusting timing of at least one of the red pixel data, the green pixel data or the blue pixel data.

6. The projector system of claim 1, wherein the controller is configured to compensate for detected vertical and/or horizontal light beam misalignment(s) by adjusting timing of at least one of the first, second or third pixel data.

7. The projector system of claim 1, wherein:
the plurality of electrically isolated PD segments comprises four electrically isolated PD segments;
each of the four electrically isolated PD segments produces a corresponding current indicative an amount of light detected by the PD segment;
the equation Y_Offset=(A+B)−(C+D) is used to produce the signal indicative of vertical light beam alignment for each of the light emitting elements; and
the equation X_Offset=(A+C)−(B+D) is used to produce the signal indicative of horizontal light beam alignment for each of the light emitting elements,
where
A is indicative of the current produced by a first one of the four electrically isolated PD segments,
B is indicative of the current produced by a second one of the four electrically isolated PD segments,
C is indicative of the current produced by a third one of the four electrically isolated PD segments, and
D is indicative of the current produced by a fourth one of the four electrically isolated PD segments.

8. The projector system of claim 7, wherein the equation Power=A+B+C+D is used to produce a signal indicative of light beam power for each of the light emitting elements.

9. A projector system, comprising:
a first light emitting element that emits light of a first color;
a second light emitting element that emits light of a second color;
a third light emitting element that emits light of a third color;
a controller configured to produce first, second and third pixel data in dependence on a video signal received from a video source;
a driver configured to drive the first, second and third light emitting elements in dependence on the first, second and third pixel data produced by the controller;
one or more micro-mirror(s) that project an image in dependence on light beams produced in dependence on the light of the first, second and third colors emitted by the first, second and third light emitting elements; and
an opto-electronics circuit including
a plurality of electrically isolated photodetector (PD) segments; and
circuitry configured to control how currents indicative of light detected by the plurality of electrically isolated PD segments are arithmetically combined;
wherein
the controller is configured to detect vertical and/or horizontal light beam misalignment(s) in dependence on signals produced by the opto-electronics circuit;
the controller is configured to compensate for detected vertical and/or horizontal light beam misalignment(s);
each of the plurality of electrically isolated PD segments produces a corresponding current indicative an amount of light detected by the PD segment;
the circuitry, configured to control how currents indicative of light detected by the plurality of electrically isolated PD segments are arithmetically combined, comprises switches, trans-impedance amplifiers (TIAs) and a current mirror;

when the switches are in a first configuration, the TIAs and the current mirror are used to produce a signal that is indicative of vertical light beam alignment;
when the switches are in a second configuration, the TIAs and the current mirror are used to produce a signal that is indicative of horizontal light beam alignment; and
when the switches are in a third configuration, the TIAs are used to produce a signal indicative of light beam power.

10. A method for use with a projector system, comprising:
receiving a video signal;
producing first, second and third pixel data in dependence on the received video signal;
driving first, second and third light emitting elements, in dependence on the first, second and third pixel data, to thereby emit light of first, second and third colors;
producing light beams of the first, second and third colors in dependence on the emitted light of the first, second and third colors;
controlling one or more micro-mirror(s) to thereby project an image in dependence on the light beams of the first color, the second color and the third color;
using a plurality of electrically isolated photodetector (PD) segments to detect portions of the light beams of the first color, the second color and the third color, wherein each of the PD segments produces a current indicative of light detected by the PD segment;
for each of the light beams of the first color, the second color and the third color, arithmetically combining the currents indicative of light detected by the plurality of electrically isolated PD segments in at least two different manners;
detecting vertical and/or horizontal light beam misalignment(s) in dependence on results of the arithmetically combining the currents; and
compensating for detected vertical and/or horizontal light beam misalignment(s);
wherein the arithmetically combining is performed using switches, trans-impedance amplifiers (TIAs) and a current mirror, and includes
for each of the light beams of the first color, the second color and the third color, configuring the switches in a first configuration that causes the TIAs and the current mirror to produce a signal that is indicative of vertical light beam alignment; and
for each of the light beams of the first color, the second color and the third color, configuring the switches in a second configuration that causes the TIAs and the current mirror to produce a signal that is indicative of horizontal light beam alignment.

11. The method of claim 10, further comprising:
for each of the light beams of the first color, the second color and the third color, configuring the switches in a third configuration that causes the TIAs to produce a signal indicative of light beam power.

12. The method of claim 11, further comprising:
performing automatic power control (APC) in dependence on the signal indicative of light beam power that is produced for each of the light beams of the first color, the second color and the third color.

13. The method of claim 12, wherein performing APC includes compensating for a detected change in output power by changing an amplitude and/or pulse width of one or more signals used for driving the first, second and third light emitting elements.

14. The method of claim 12, further comprising:
performing color calibration in dependence on the signal indicative of light beam power that is produced for each of the light beams of the first color, the second color and the third color.

15. A method for use with a projector system, comprising:
receiving a video signal;
producing first, second and third pixel data in dependence on the received video signal;
driving first, second and third light emitting elements, in dependence on the first, second and third pixel data, to thereby emit light of first, second and third colors;
producing light beams of the first, second and third colors in dependence on the emitted light of the first, second and third colors;
controlling one or more micro-mirror(s) to thereby project an image in dependence on the light beams of the first color, the second color and the third color;
using a plurality of electrically isolated photodetector (PD) segments to detect portions of the light beams of the first color, the second color and the third color, wherein each of the PD segments produces a current indicative of light detected by the PD segment;
for each of the light beams of the first color, the second color and the third color, arithmetically combining the currents indicative of light detected by the plurality of electrically isolated PD segments in at least two different manners;
detecting vertical and/or horizontal light beam misalignment(s) in dependence on results of the arithmetically combining the currents; and
compensating for detected vertical and/or horizontal light beam misalignment(s);
wherein the arithmetically combining is performed using switches, trans-impedance amplifiers (TIAs) and a current mirror, and includes
for each of the light beams of the first color, the second color and the third color, while the light beam is being scanned vertically, configuring the switches in a first configuration that causes the TIAs and the current mirror to produce a signal that is indicative of vertical light beam alignment; and
for each of the light beams of the first color, the second color and the third color, while the light beam is being scanned horizontally, configuring the switches in a second configuration that causes the TIAs and the current mirror to produce a signal that is indicative of horizontal light beam alignment.

16. A projector system, comprising:
a first light emitting element that emits light of a first color;
a second light emitting element that emits light of a second color;
a third light emitting element that emits light of a third color;
a controller configured to produce first, second and third pixel data in dependence on a video signal;
a driver configured to drive the first, second and third light emitting elements in dependence on the first, second and third pixel data produced by the controller;
one or more micro-mirror(s) that project an image in dependence on light beams produced in dependence on the light of the first, second and third colors emitted by the first, second and third light emitting elements;
a plurality of electrically isolated photodetector (PD) segments, each of which produces a corresponding current indicative an amount of light detected by the PD segment;
switches, trans-impedance amplifiers (TIAs) and a current mirror that are collectively configured to control how currents indicative of light detected by the plurality of electrically isolated PD segments are arithmetically combined;
wherein when the switches are in a first configuration, a signal indicative of vertical light beam misalignment is produced;
wherein when the switches are in a second configuration, a signal indicative of horizontal light beam misalignment is produced; and
wherein the controller is also configured to detect and compensate for vertical and/or horizontal light beam misalignment(s) in dependence on the produced signals indicative of vertical light beam misalignment and horizontal light beam misalignment.

17. The projector system of claim 16, wherein:
when the switches are in a third configuration, a signal indicative of light beam power is produced; and
the controller is also configured to performing automatic power control (APC) in dependence on the produced signal indicative of light beam power.

18. The projector system of claim 17, wherein:
the controller is also configured to performing color calibration in dependence on the produced signal indicative of light beam power.

* * * * *